United States Patent Office 3,504,148
Patented Mar. 31, 1970

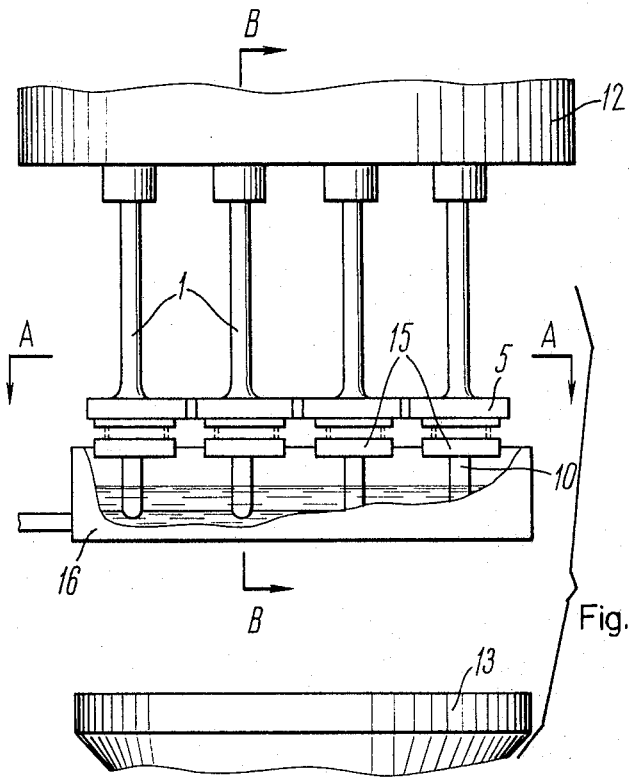
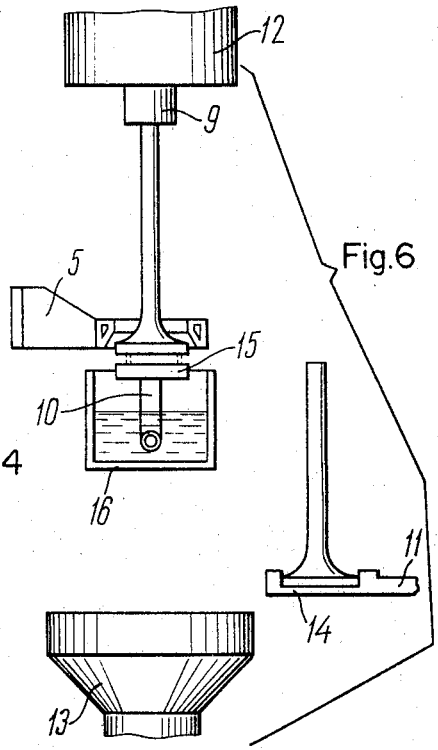
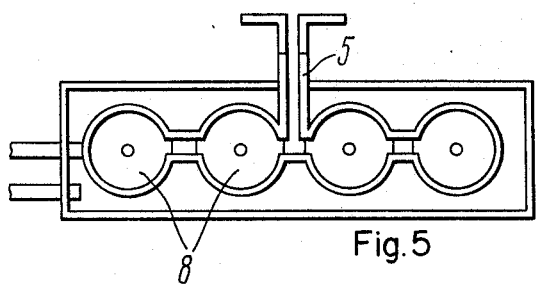
Fig. 4
Fig. 5
Fig. 6

3,504,148
METHOD AND APPARATUS FOR PRODUCING BI-METALLIC ARTICLES BY INDUCTIVE HEATING AND POSITIONING MEANS
Boleslav Ivanovich Maximovich, Bulvar Lesi Ukrianki 2, kv. 52; Daniil Andreevich Dudko, Ulitsa Mechnikova 3, kv. 7; and Vitaly Voitsekhovich Zavodian, Bulvar Ivana Lepse 55, kv. 20, all of Kiev, U.S.S.R.
Filed Sept. 13, 1967, Ser. No. 667,593
Claims priority, application U.S.S.R., Feb. 13, 1967, 1,131,881
Int. Cl. B23k 13/00; H05b 5/00, 9/00
U.S. Cl. 219—9.5                    6 Claims

ABSTRACT OF THE DISCLOSURE

A bimetallic article in the general shape of a solid of revolution such as a valve, is produced by placing a ring of a filler alloy on a base which is to be combined with the material of the ring to form a bimetallic article, thereafter melting the ring by energizing an inductor surrounding the ring, the frequency of the current in the inductor being such as to provide a depth of current penetration in the ring at least over the entire thickness thereof and to electrodynamically maintain the ring in position, and thereafter cooling the article to solidify the material of the ring while the inductor is still energized but at a reduced power.

---

The present invention relates to methods and apparatus for producing bimetallic articles, shaped, in general, as solids of revolution, and, more particularly, valves.

Known in the art are methods of producing bimetallic articles, for example valves, by plasma hard surfacing, in the course of which a metal ceramic ring produced by compacting and sintering metallic powders is melted on a valve disk by a constricted arc-plasma. To protect the deposited alloy from oxidation, the hard surfacing zone is blown off with argon. The constricted arc melts the metal ceramic ring and simultaneously slightly melts the surface being built up, whereby bonding of dissimilar materials is provided. In order that no crater be developed at the point of conjugation of the beginning and the end of the hard surfacing, hard surfacing is finished with a smooth reduction in the power of the constricted arc (see "Automatic Welding," No. 1, 1963, pp. 1–6).

Also known in the art is a method and apparatus for induction hard surfacing of valves with the use of high frequency currents by melting cast rings of stellite on valve disks.

Valves with rings laid on them are fed into rotating chucks of a six-spindle turret and then subjected to the following technological operations: spraying the ring and the valve with liquid oil, blowing off with powder flux, preliminary high frequency heating, melting the ring in an inductor with high frequency currents of 450,000 cycles per second and with seven gas jets, discharging and delayed cooling of the valves.

The productive capacity of such an automatic machine equals up to 85 valves per hour (see J. "Machinery," Mar. 1, 1957, No. 2003, pp. 475–483).

The apparatus includes a turntable with tongs to hold valve bars, an inductor for preheating, a second inductor for melting the rings, a device for spraying the bars with oil and flux, and an electric heat-treating furnace for delayed cooling of the bars.

The disadvantage of the hard surfacing method with the use of a constricted arc employing metal ceramic rings lies in the fact that said method fails to provide building up of valves of a considerable diameter, such as for powerful diesel engines, in a single pass. In the case of plasma hard surfacing, any slight variation of plasma burning conditions or violation of the plasma position leads to incomplete penetration or to excessive penetration of the valve bar, whereby the quality of the hard-surfaced valves is impaired.

The most essential disadvantage of hard surfacing of valves with high frequency current resides in low productivity of the process and complicated system for shielding the alloy being hard-surfaced from oxidation. High frequency currents are converted into heat power in a very thin external layer of the cast ring and subsequent layers of metal are melted mainly due to the heat transfer from the external layer.

Thus at a frequency of 450,000 cycles per second, the depth of current penetration in a ring of stellite amounts only to a few fractions of a millimeter. This causes the low speed of melting of the ring and the necessity of careful isolation of the ring being melted from air atmosphere. In addition, the described methods do not provide a stable quality of the hard surfacing and pores and non-metallic inclusions may occur. The valves hard-surfaced by the constricted arc or with high frequency currents require machining which increases their cost.

The object of the invention is to provide a method and apparatus for producing bimetallic articles, shaped, generally, as solids of revolution, and more particularly valves, which will allow obtaining bimetallic valves free from incomplete or excessive penetration of the deposited layer in the valve bars, and free of pores and non-metallic inclusions in the deposited layer. Also, the requirement for subsequent machining is reduced, thereby lowering the cost of the finished valves.

The novel feature of the invention lies in the fact that in the production of bimetallic articles, such as valves with induction heating, a ring of a filler alloy is hard-surfaced on the bar by melting the filler ring laid preliminarily on the bar; the ring of the filler alloy and the bar being located in such a way that the ring being melted is in the direct vicinity of the bottom end of the circular inductor in the zone of action of electrodynamic forces, the current frequency being such as to provide a depth of penetration at least over the entire thickness of the filler ring; whereupon the molten alloy is cooled and solidified with a heat carrier supplied to the bar while simultaneously the action of the inductor electromagnetic field is applied thereto.

In melting the ring of the filler alloy and cooling the bar with the heat carier, it is expedient to rotate said bar about its vertical axis.

The apparatus for effecting the above method comprises an inductor, having at least one circular heating winding above which tongs are rotatably mounted for keeping the bar in its working position, a mechanism for feeding the bar into the tongs and a cooling device, said mechanism and cooling device benig mounted under the inductor.

For a better understanding of the nature of the present invention, given below is a description of a specific embodiment thereof, to be had in conjunction with the acompanying drawing, wherein:

FIG. 4 shows a front view of the apparatus for producing bimetallic valves, according to the invention;

FIG. 5 is a section along AA of FIG. 4; and

FIG. 6 is a section along BB of FIG. 4.

Figure 1:
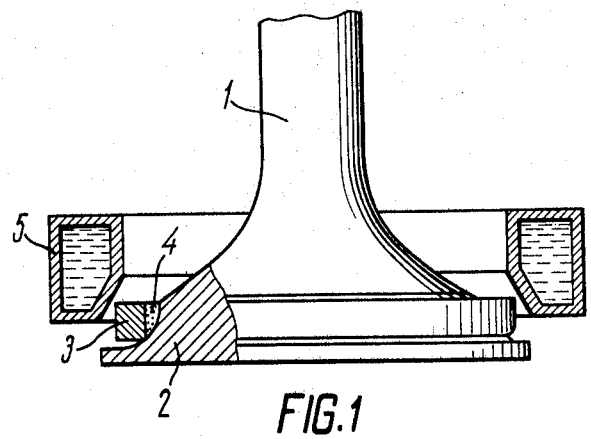
FIG. 1 shows a valve bar put into the zone of inductor action at the moment before hard surfacing.

For producing a bimetallic valve, a bar 1 (FIG. 1), with a ring 3 of filled alloy and flux 4 preliminary put on the flange of its disk, is located in the vicinity of the bottom end of an inductor 5.

Figure 2:
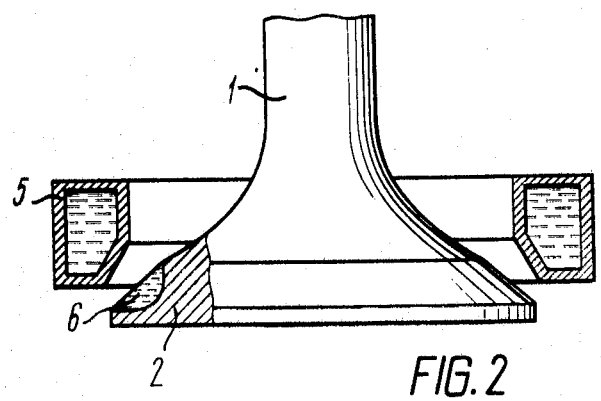
FIG. 2 shows the same at the moment of complete melting of the filler alloy ring.

The ring 3 and flux 4 are heated with currents of high frequency (1000-8000 cycles per second), which provides a depth of current penetration over the entire thickness of the ring 3. The ring 3 is melted practically over the entire thickness, forming a molten alloy pool 6 on the disk 2 of the bar 1, (FIG. 2), the surface of said pool being located at an angle of 25-70° to the vertical, depending on the distance between it and the inductor 5. In this condition the molten alloy is affected by the electrodynamic forces, directed perpendicular to the alloy surface, owing to which the molten alloy is retained on the flange of disk 2.

Figure 3:
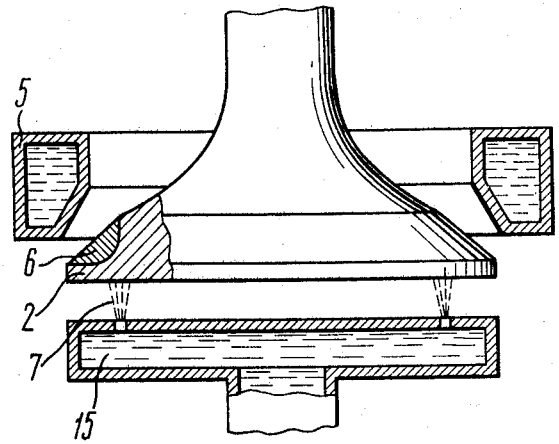
FIG. 3 is the same at the moment of crystallization of the molten alloy.

Then, for intense cooling, water 7 (FIG. 3), oil or compressed air is fed to the disk 2 towards the molten alloy 6. In addition, the voltage from the inductor 5 is not removed until complete solidification of the alloy on the disk 2 occurs. Due to this, a controlled crystallization of the alloy without shrinkage defects, non-metallic inclusions and pores is attained.

To ensure uniform heating during the whole process of hard surfacing, the valve bar is rotated about its vertical axis at a speed of 15-100 r.p.m.

As an example, given hereinbelow is specific data for hard surfacing of valves of 80 mm. diameter made of steel having the following composition: 0.4-0.5% C, 12-14% Cr, 12-14% Ni, 0.8% Si, 2.0-2.75% W, 0.25-0.40% Mo, the rest being iron.

The inductor is of a single-turn copper ring which is water-cooled and has an external diameter of 110 mm., and an internal diameter of 80 mm. The distance from the lower valve flange during hard surfacing is 12-14 mm.

Electrical conditions of the hard surfacing are: current frequency, 2500 cycles per second; voltage on the inductor, 18-19 v.; power, 25 kw.; time consumed for melting an alloy ring and for molten alloy heating up to 1260-1280° C. equals 20 sec.; at the 20th sec. the power is reduced to 10-12 kw. and simultaneously water is fed to the flange through 18 holes of 1.2 mm. dia. each, uniformly spaced along the circumference of 60 mm. dia. every 10 mm.; water pressure, 2 atm.; duration of water feed, 10-12 sec.; duration of the whole period of hard surfacing is 30-32 sec. During the whole cycle of the hard surfacing the valve rotates at a speed of 15-25 r.p.m.

The apparatus shown in the drawings for producing bimetalic valves consists of the inductor 5 (FIGS. 4 and 5), having four heating sets 8 connected in series, four tongs 9, located above the inductor 5, as well as a cooling device 10 and a feeding mechanism 11 (FIG. 6) located under the inductor. The tongs 9 are mounted on a common casing 12, accommodating a drive for rotating the tongs. Under the inductor 5 is a hopper 13 for hard-surfaced bars. The feeding mechanism 11 has four nests 14 with fixing devices (not shown in the drawing) for mounting the valve disks therein.

The cooling device 10 (FIG. 4) has four sprayers 15 and a water collector 16.

The apparatus of the invention operates as follows. The feeding mechanism 11 performing horizontal and vertical movement simultaneously loads four bars with rings of filler alloys into the tongs 9 and returns to its initial position. Voltage is supplied to the inductor and then melting of the rings is carried out. The cooling device 10, movable in horizontal and vertical directions, is brought to the working position, and the sprayers 15 direct water onto the disk 2. Then the cooling device 10 returns to its initial position. The hard-surfaced bars 1 are released from the tongs 9 and drop into the hopper 13.

The technical and economical data of the apparatus operation are as follows: power, 100 kw.; current frequency for hard surfacing of valves up to 50 mm. in diameter, 8000 cycles per second; efficiency of hard surfacing of valves up to 50 m. in dia., 800 p.c.s. per hour, and of those up to 150 mm., 300 p.c.s. per hour.

Valves for internal combustion engines produced by the method described hereinabove feature service life 3-6 times longer than similar valves without hard surfacing.

We claim:

1. A method of producing bimetallic articles in the general shape of solids of revolution, said method comprising placing a ring of a filler alloy on a base which is to be combined with the material of the ring to form a bimetallic article, positioning an inductor around the ring and base, applying electrical power to the inductor with a current frequency sufficient to subject the ring to heating and position-maintaining electrodynamic forces throughout the depth thereof to heat and melt the ring, reducing the electrical power applied to the conductor after the ring has melted, and cooling the article to solidify the material of the ring while the inductor is energized with reduced electrical power.

2. A method as claimed in claim 1 comprising rotating said base about a vertical axis during the heating of the ring and the cooling of the article.

3. A method as claimed in claim 2 wherein said cooling is effected by spraying a coolant on said base.

4. A method as claimed in claim 1 wherein the base is formed with a cavity into which the material of the ring is to be received.

5. Apparatus for producing bimetallic articles in the general shape of solids of revolution, said apparatus comprising inductor means including at least one annular winding, holding means for supporting a base with a ring therein in the region of the winding of the inductor means, such that with the inductor means energized, the ring is heated and melted and maintained in position by electrodynamic forces and is incorporated with the base to form said article, means for supplying reduced electrical power to the inductor means after melting of the ring and means for feeding a coolant against said base to cool the molten material of the ring while the inductor means is still energized with the reduced electrical power.

6. Apparatus as claimed in claim 5 wherein said means for feeding a coolant against the base comprises a device positioned beneath the inductor for spraying the coolant against said base.

References Cited

UNITED STATES PATENTS

| | | | |
|---|---|---|---|
| 1,709,606 | 4/1929 | Catland | 219—77 X |
| 2,625,638 | 1/1953 | Garner et al. | 219—10.53 X |
| 2,653,210 | 9/1953 | Becker et al. | 219—9.5 |
| 3,060,067 | 10/1962 | Kennedy | 219—10.53 X |

JOSEPH V. TRUHE, Primary Examiner

R. F. STAUBLY, Assistant Examiner

U.S. Cl. X.R.

219—76, 10.41